United States Patent [19]
Yokotsuka et al.

[11] 3,897,570
[45] July 29, 1975

[54] PREPARATION OF AN ACIDIC BEVERAGE

[75] Inventors: Tamotsu Yokotsuka, Nagareyama; Yasuo Aoyama; Tadaaki Kikuchi; Shigetaka Ishii; Masaru Matsuura, all of Noda, Japan

[73] Assignee: Kikkoman Shoyn Co. Ltd., Tokyo, Japan

[22] Filed: Jan. 28, 1974

[21] Appl. No.: 437,320

Related U.S. Application Data

[63] Continuation of Ser. No. 267,214, June 28, 1972, abandoned, which is a continuation of Ser. No. 114,053, Feb. 9, 1971, abandoned, which is a continuation-in-part of Ser. No. 796,544, Feb. 4, 1969, abandoned.

[30] Foreign Application Priority Data

Sept. 17, 1968 Japan................. 43-66562

[52] U.S. Cl. .............. 426/46; 195/29; 426/52; 426/190; 426/364; 426/365
[51] Int. Cl.² ..................... A23L 1/20; A23L 2/00
[58] Field of Search ......... 426/364, 41, 49, 212, 52, 426/190, 46, 365; 195/62, 29

[56] References Cited
UNITED STATES PATENTS

| | | | |
|---|---|---|---|
| 3,170,802 | 2/1965 | Fukushima | 426/46 |
| 3,510,402 | 5/1970 | Marshall | 195/62 |
| 3,645,745 | 2/1972 | Magnino, Jr. et al | 426/364 |
| 3,713,843 | 1/1973 | Pour-el et al. | 426/44 |
| 3,761,353 | 9/1973 | Noe et al. | 426/44 |
| 3,843,802 | 10/1974 | Puski | 426/46 |
| 3,846,560 | 11/1974 | Hempenius et al. | 426/46 X |
| 3,852,480 | 12/1974 | Williams | 426/46 |

OTHER PUBLICATIONS

Fujimaki, et al., Applying Proteolytic Enzymes on Soybean, Food Technology, Vol. 22, 1968, (pp. 77-81).

Primary Examiner—David M. Naff
Attorney, Agent, or Firm—Cushman, Darby & Cushman

[57] ABSTRACT

An acidic beverage containing 1–4% peptides is prepared by denaturing defatted soybeans, reacting an aqueous mixture of the denatured defatted soybeans with an acid protease at a pH of 2.5 to 6.0 at a temperature from room temperature to 90°C to form peptides until before a ratio of formal-state nitrogen to total nitrogen in a filtrate of the mixture reaches 20%, separating a clear portion from the reaction mixture and adding to the clear portion a beverage additive.

13 Claims, No Drawings

PREPARATION OF AN ACIDIC BEVERAGE

This application is a continuation of application Ser. No. 267,214 filed June 28, 1972, now abandoned which in turn is a continuation of application Ser. No. 114,053 filed Feb. 9, 1971, now abandoned, which in turn is a continuation-in-part of application Ser. No. 796,544 filed Feb. 4, 1969, now abandoned.

This invention relates to a method for preparing an acidic beverage, and more particularly to a method for preparing an acidic beverage containing tasteless and odorless peptides obtained by decomposition of denatured, defatted soybeans in an acidic condition at an elevated temperature using an acid protease produced by microorganisms.

Shortage of protein source due to an increase in world population is now a serious problem, and one of the counter measures is a utilization of soybean protein. Particularly, defatted soybean, which is a residue obtained when oil is extracted from the soybean, is widely utilized as foodstuff, because the defatted soybean has a higher protein content and its amino acid composition is nutritionally excellent. Recently, the defatted soybean is utilized as it is, or the contained protein is separated from the defatted soybean, and utilized after mixed with other foodstuffs, or utilized as the so-called soy meat after a meat-like texture and flavor are added to the separated protein. In all these cases, the soybean protein is utilized in a solid state. According to another method for utilizing the soybean protein, it can be utilized in a liquid state as a soy milk, which has been utilized in the East from old. The soy milk is a milklike liquid prepared by soaking 1 part by volume of soybeans into 3 parts by volume of water to soften the soybean tissue, then adding to the soaked soybeans 5 to 10 parts by volume of water and grinding them to a mixture, and subjecting the resultant mixture of soybeans and water to boiling and filtration.

Accordingly, in the soy milk, the soybean protein is utilized as it is, as foodstuff, differing from miso or soy sauce in which soybean protein is utilized after enzymatic decomposition. Recently, a restudy has been made especially of the soy milk owing to its usefulness, and the studies have been concentrated upon removal of beany flavor and improvement in economics.

However, when the soybean protein is utilized in the form of soy milk, the protein coagulates and precipitates at an acidic side, for example, pH 2.5 to 6.0. because the protein is insoluble under acidic conditions. Or, the soy milk itself is in an emulsion state such as a milk, and thus an acidic and clear beverage pleasing the taste of modern people has not been prepared yet by mixing it with a fruit juice or the like.

The present inventors have made studies of an acidic beverage of a high nutritive value which essentially comprises a soybean protein and is soluble in fruit juice and other acidic flavoring and seasoning agents without coagulation and precipitation, and capable of retaining clearity unless other colloidal material is added thereto with necessity, and have established the present invention.

That is to say, the present invention is to provide a method for preparing an acidic beverage, which comprises denaturing defatted soybeans, reacting the mixture of denatured defatted soybeans and water with an acid protease at a pH of 2.5 to 6.0 at a temperature of from room temperature to 90°C until before a ratio of formol-state nitrogen to total nitrogen of the filtrate of reaction mixture reaches 20%, separating a clear portion from the resulting reaction mixture, and adding at least one of such beverage additives as water, fruit juices, sweetenings, vessicatories, organic acids, coloring agents, nutritive intensifiers such as amino acids and vitamins, and physiologically active substances such as hormones, to said clear portion as it is, or after purified, concentrated or dried, if necessary.

The soybean protein used in the present invention is only for preparation of a beverage therefrom, and thus it is desirable that the treated product, especially hydrolysate of the soybean be tasteless and odorless and that the treatments, particularly, hydrolysis of the soybean protein, be simple. Accordingly, the so-called defatted soybeans obtained as a residue when oil is removed from the soybeans, for example, soybean flakes, grits, meal, or flour obtained by pressing or grinding soybeans and extracting oil from the resultant soybeans using such a solvent as n-hexane, ether or alcohol according to the conventional method, are used as raw material soybean protein.

A considerable amount of the soybean protein is soluble in water under alkaline or neutral conditions and it is well known that the solubility of the protein in water can be improved by subjecting the protein to enzymatic reaction as set forth in U.S. Pat. Nos. 2,919,195 and 3,220,851. However, the protein coagulates and precipitates, as set forth above, under acidic conditions.

Into order to make soybean protein soluble in water under an acidic condition with a clarity, it is necessary to change the soybean protein into lower molecular weight peptides or amino acids by changing the structure of soybean protein or hydrolizing the soybean protein. In that case, excess of amino acids due to the over decomposition of the soybean protein will cause to increase a disagreeable taste in beverage. The excess of amino acids is rather undesirable, and thus it is necessary to control the degree of decomposition and make the product almost tasteless and odorless.

As a result of the studies of the degree of decomposition, the present inventors have found that it is preferable that the ratio of formol-state nitrogen (most of amino acids and ammonium nitrogen) to total nitrogen (hereinafter referred to an FN/TN ratio) is not more than 20%, and more preferably about 10%.

Further, the present inventors have found that enzymatic hydrolysis under acidic conditions using an acid enzyme produced by microorganisms is preferable to hydrolysis using an acid in decomposing the soybean protein, because the enzymatic hydrolysis neither produces any undesirable taste nor decomposes essential amino acids.

Furthermore, the present inventors have found that it is essential in carrying out the enzymatic hydrolysis of the soybean protein to use denatured protein to make complete the decomposition of the protein since undenatured soybean is soluble in water and it is difficult to decompose the protein dissolved in water by subjecting to enzymatic reaction; and prevent any production of bitterness.

The denatured defatted soybean, that is, defatted soybean contained denatured protein, is prepared by heating or steam cooking the defatted soybeans in the presence of water or lower alcohols, and the thus obtained, denatured, defatted soybean can readily undergo the enzymatic action. Further, it is an essential condition for the present invention that the decomposition product of the denatured, defatted soybean be tasteless and odorless.

As a result of various studies of enzyme preparations and methods for decomposition, which satisfy said essential condition, the present inventors have found that it is essential for producing an acidic beverage of the present invention in a high yield to react denatured, defatted soybeans with an acid protease produced by microorganisms or an enzyme preparation containing said acid protease as an essential enzyme under an acidic condition of a pH of 2.5 to 6.0 at a temperature from room temperature to 90°C and stop the reaction until before a ratio of formol-state nitrogen to total nitrogen in the filtrate of reaction mixture reaches 20%. In that case, too short period of reaction lowers yields of peptides, whereas too long period of reaction contributes to over-decomposition. Thus, it is necessary to properly adjust the period of reaction.

In the case that a protease other than an acid protease such as, for example, alkaline protease or neutral protease is employed, there is obtained a product having an FN/TN ratio more than 20%; since there is formed a large amount of amino acids. For instance, protease from *Aspergillus sojae* employed for producing soy sauce decomposes the protein into amino acids, thereby a solution having an FN/TN ratio more than 20% is obtained as set forth in U.S. Pat. No. 3,170,802.

In carrying out the present invention, it is necessary, first of all, to denature the raw material defatted soybeans. As a method for denaturing the defatted soybean protein suitable for the present invention, steam cooking of the defatted soybeans after water has been added to the defatted soybeans is preferable, because it is simple in operation and a relatively satisfactory denatured, defatted soybean protein is obtainable. For example, 1 to 2 parts by volume of water is added to 1 part by volume of defatted soybenas and then, the steam cooking is carried out under a pressure of 0.8 to 1.0 $Kg/cm^2$ for 30 to 60 minutes. The higher the pressure, the shorter the steam cooking time. In the case of defatted soybean meal, the denaturing can be carried out under pressure in the same manner as above, or may be carried out by steam cooking at 100°C for a short time, for example, 10 to 60 minutes after 5 to 10 parts by volume of water has been added to 1 part by volume of meal.

The denaturing of protein is a change of its original structure, and in the present invention, the denaturing is carried out by heating the defatted soybean protein in the presence of water or a water-soluble organic solvent, or soaking the defatted soybean protein in a water-soluble organic solvent.

End point of denaturing of the protein can be determined by the conventional methods, such as an enzymatic method or an acidity titration method. According to the enzymatic method, a definite amount of denatured soybeans is placed in a test tube, and 10 ml of 0.5 M buffer solution, 10 ml of an enzyme solution from yellow-Aspergilli and 1 mol of toluene are added to the test tube. Then, the test tube is tightly stoppered and shaken at 30°C for 20 hours. After the shaking, the reaction mixture is subjected to centrifugal separation, and the supernatant liquid is collected and trichloroacetic acid is thereto added. The degree of light extinction at 660 m$\mu$ of the solution is measured. When there remains non-denatured protein in the solution, precipitates are formed with trichloroacetic acid, but when the denaturing is complete, the degree of light extinction at 660 m$\mu$ is zero. In the present invention, the denatured, defatted soybean protein having zero degree of light extinction is used.

According to the acidity titration method, water is added to the denatured soybean, and the mixture is homogenized and centrifuged. The supernatant liquid is titrated with 1/50 M sodium hydroxide until pH reaches 10.5. The acidity is represented by the amount of sodium hydroxide required for the titration. In the present invention, the denatured, defatted soybean protein having a titration value of at least 2.8 is used.

In view of the yield and deodoring of the product, it is more advantageous to conduct denaturing at 100°C or less using an aqueous solution of ethanol or other lower alcohol. These solvents can be used in a liquid or gaseous state. For example, one preferable denaturing is such that the defatted soybean meal is soaked in an aqueous ethanol or other alcohol solution containing 10% of water and subjected to stirring and extraction at about 80°C for 20 minutes to remove alcohol-soluble oligosaccharide, coloring material and odorous components therefrom as well as denature the soybean protein, and then alcohol is removed.

The flavor of the thus obtained, denatured, defatted soybean is quite different from that of raw material soybeans, and the so-called green knote of the raw material soybeans is completely eliminated. The denatured, defatted soybean has only a flavor of cooked beans, and the difference in components between the green knote and flavor of cooked beans can be clearly distinguished chromatographically.

Any acid protease can be used in the present invention, so long as the acid protease is the one protease is the one produced only by microorganisms. Particularly, enzymes produced by black Aspergilli such as *Aspergillus inuii* ATCC No. 14333, *Aspergillus usami* ATCC No. 14331 and *Aspergillus saitoi* ATCC No. 14332 are preferable.

Another preferred acid protease is the enzyme produced by *Penicillium duponti* ATCC 20186 deposited in the American Type Culture Collection. This protease can be produced as shown in Yokotsuka application Ser. No. 884,740 filed Dec. 12, 1969. The entire disclosure of application Ser. No. 884,740 is hereby incorporated by reference. Thus the protease can be prepared in the manner set forth in any of examples 1, 2, 3, 4, 5, 6 and 7 of said application Ser. No. 884,740.

As an enzyme preparation, a culture filtrate of said strains, an extract solution from cultivated material of said strain, a preparation salted out with ammonium sulfate, a precipitate with such an organic solvent as ethanol or acetone, or further purified enzyme can be used in the present invention. From a view point of economics or foodstuff, a precipitate with ethanol is preferable.

The amount of enzyme in the present invention is variable, depending upon a situation, but 0.05 to 2.0% by weight of crude enzyme preparation is sufficient for the present invention on the basis of the weight of the denatured, defatted soybean. However, it is preferable to decide the amount of enzyme in view of a ratio of formol-state nitrogen to total nitrogen in the product.

An elevated temperature is desirable for conducting the decomposition of the denatured, defatted soybean by the enzyme, that is, acid protease, to effect preservation of the reaction mixture, increase the degree of decomposition and make as low as possible the ratio of formol-state nitrogen to total nitrogen, and a temperature of at least 40°C is necessary for the decomposition. Thus, it is also desirable that the acid protease having a high thermostability is used in the present invention.

As typical of such acid proteases having a high thermostability there can be used the aforementioned enzyme produced by *Penicillium duponti* ATCC 20186 produced in application Ser. No. 884,740. This enzyme shows an enzymatic activity at a pH of 1.5–6.5 and its optimum pH is 2.0–3.0. This enzyme can work in a wide temperature range, e.g. from room temperature (about 20°C) to 90°C. The optimum temperature is 60°C at a pH of 2.5; 75°C at a pH of 3.5 and 75°–80°C at a pH of 4.5. The optimum temperature is higher than that of any of the heretofore known acid proteases.

The decomposition period, when said acid protease is used, depends upon the decomposition temperature, but a period of the decomposition from 3 to 10 hours at a temperature of 40° to 70°C with a suitable means such as stirring is usually suitable for a mixture of 1 part by volume of raw material denatured, defatted soybean, 5 to 7 parts by volume of water and an organic or inorganic acid for controlling a pH of the mixture, when placed in a suitable vessel, whereby the filtrate of the mixture having a ratio of formol-state nitrogen to total nitrogen of 20% or less can be produced at a 60 to 80% yield of desired peptide fraction in terms of protein in the raw material denatured, defatted soybean.

The acid used for controlling the pH of the reaction mixture includes such inorganic acids as hydrochloric acid and phosphoric acid, and such organic acids as acetic acid, citric acid, fumaric acid, malic aicd and lactic acid, but it is important to select the acid in view of the taste of the final product.

The thus obtained decomposition product is then subjected to filtration or centrifugal separation to remove solid matters, and the thus obtained clear portion is utilized as it is, or after having been subjected to further purification such as solvent extraction or absorption treatment using active carbon or ion exchange resin, or to concentration or drying and pulverization by the conventional methods under conditions where no degradation would take place.

The thus obtained clear portion, or purified liquid, or concentrated liquid or powders are colorless or yellowish white, have a plain taste though somewhat acidic, neither coagulate nor precipitate in an acidic condition, and are used as they are or after mixed with at least one of such beverage additives as water, sweetenings such as sucrose, glucose, or artificial sweetenings; vessicatories such as sodium bicarbonate; flavours such as fruit essence and beverage essence; organic acids such as lactic acid, malic acid, citric acid, and tartaric acid; coloring agents such as caramel; nutritive intensifiers such as amino acids and vitamines; and physiologically active materials such as hormones. An excellent acidic and clear beverage can be obtained therefrom by making them acidic. Of course, it is possible to prepare an unclear acidic beverage by adding an emulsified substance such as fermented milk or a substance whose emulsified state is desirable from the standpoint of liking for a beverage.

The acidic beverage obtained according to the present invention has a pH of less than 6.0 and contains 1 to 4% peptides, which is equivalent to the nutritive value of milk.

The present invention will be hereunder explained, referring to Examples.

EXAMPLE 1

To 300 Kg of defatted soybean meal was added 2 Kl of water, and denaturing of the defatted soybean meal was conducted by steam cooling at 100°C for 30 minutes. The solution extracted from cooked defatted soybean, with an enzyme from yellow Aspergilli, underwent no precipitation when trichloroacetic acid solution was thereto added. It was confirmed that complete denaturing was attained. Then, 30 Kg of citric acid was added to the cooked solution to adjust pH to 3.8, and then 3 Kg of an enzyme preparation containing acid protease obtained by subjecting koji of wheat bran, which is obtained by culturing *Aspergillus inuii* ATCC No. 14333, to water extraction, subjecting the extract to ethanol precipitation and adjusting the precipitate according to the conventional method, was added thereto. Enzyme reaction was conducted at 50°C for 6 hours with stirring, and then reaction mixture was subjected to pressure filtration. To 1.9 Kl of the thus obtained acidic peptides solution having a pH of 4.0 was added 5 Kg of active carbon for decoloring, and then the decolored solution was subjected to spray drying, whereby 200 Kg of powders was obtained. The thus obtained powders were odorless and tasteless, but had acidity and 55% peptides content in terms of protein. The formol-state nitrogen was 16% on the basis of total nitrogen. 5 Kg of the thus obtained powders were thoroughly mixed with 5 Kg of glucose, 0.2 Kg of tartaric acid, 0.5 Kg of sodium bicarbonate and small amounts of powdery cola essence, caramel and artificial sweetenings thereby to prepare a sparkling cola-type powdery beverage product.

When 11 g of the thus prepared product was dissolved in 100 ml of water, a cola-type delicious beverage containing 2.8% peptides in terms of protein was obtained.

EXAMPLE 2

30 Kg of defatted soybean meal was treated with 90% ethanol at 80°C for 20 minutes thereby to denature the meal. After removal of ethanol, 200 l of water and 3 Kg of citric acid were added to the denatured meal to adjust a pH to 3.8, and then 300 g of commercially abailable acid protease (Molsin, a trade mark of an acid protease produced by Seishin Seiyaku Co., Ltd.) was added thereto. The decomposition was carried out at 50°C for 7 hours with stirring.

After the completion of the reaction, the reaction mixture was subjected to pressure filtration, whereby 185 l of an acidic peptides solution was obtained. Then, the acidic peptide solution was spray-dried, whereby 21 Kg of powders were obtained. The thus obtained powders were tasteless, though acidic and had 58% peptides content in terms of protein. The formol-state nitrogen was 17% on the basis of total nitrogen. 2 Kg of the powders were sufficiently mixed with 4 Kg of glucose, 0.1 Kg of tartaric acid and small amounts of cola essence, and coloring agent, whereby a non-sparkling, cola-type powdery beverage product was obtained. When 1 part by volume of the thus obtained product was dissolved in about 10 parts by volume of water, a cola-type delicious beverage containing about 2% peptides in terms of protein was obtained.

EXAMPLE 3

To 3 Kg of defatted soybean meal was added 20 l of water, and denaturation of defatted soybean meal was conducted by steam cooking at 100°C for 30 minutes. Then it was confirmed according to the acidity titration method that the titration value was 3.4 and the denaturation was complete. Then, 300 g of citric acid was added to the mixture containing the denatured soybean meal to adjust a pH to 3.8, and 10 g of commercially available acid protease (Molsin, a trade mark of an acid protease manufactured by Seishin Seiyaku Co., Ltd.) was added to the mixture. Enzymatic reaction was carried out at 55°C for 10 hours with stirring, and then the reaction mixture was subjected to filtration. The thus obtained filtrate was treated with active carbon, whereby 18 l of an acidic peptides solution was obtained. The formol-state nitrogen of the solution was 15% on the basis of total nitrogen, and the solution contained 3.9% of peptides in terms of protein, had a plain taste and was odorless and clear. To the solution was added 2 Kg of glucose, 50 g of tartaric acid and a small amount of powdery fruit essence, whereby an acidic beverage having a better fruit-like flavor was obtained.

EXAMPLE 4

Sixty Kg of defatted soybean flakes was added to 80 l of water, and denaturation of defatted soybean flakes were conducted under a pressure of 1 Kg/cm$^2$ for 30 minutes. Then, 340 l of water and 6 Kg of citric acid were added to the denatured flakes to adjust a pH to 4.0, and then 300 g of the above-mentioned acid protease was thereto added. Enzymatic decomposition was carried out at 55°C for 9 hours.

After the completion of the reaction, 360 l of an acidic peptide solution was obtained. After a treatment of the thus obtained solution with Duolite S-30 (a trade mark of Duolite Inc. U.S.A.), it was concentrated to 100 l at about 40°C. The thus obtained, concentrated liquor was clear, tasteless and odorless, though acidic, and had 18% peptides content in terms of protein. The formol-state nitrogen was 14.5% on the basis of total nitrogen.

To 32 l of the thus obtained concentrated liquor were added 2 Kg of sucrose, 0.1 Kg of 85% phosphoric acid, 0.03 Kg of tartaric acid and small amounts of cola essence, coloring agent and artificial sweetenings, and then total volume was increased to 60 l by adding water thereto. When the total volume was increased to 200 l by adding plain soda thereto, a sparkling cola-type delicious beverage having 2.9% peptides content in terms of protein was obtained.

EXAMPLE 5

Three hundreds Kg of defatted soybean flakes were denatured with ethanol in the same manner as in Example 2, and then ground. Then, 2 Kl of water and 30 Kg of citric acid was added thereto to adjust a pH to 3.9, and further 2 Kg of commercially available acid protease was added thereto. Enzymatic decomposition was conducted at 50°C for 7 hours. Then, the reaction mixture was subjected to filtration, and the thus obtained filtrate was treated with active carbon, and then concentrated at 40°C, whereby 500 l of an acidic peptides syrup was obtained.

The syrup was clear and odorless and had no unpleasant flavour. The formol-state nitrogen was 16.2% on the basis of total nitrogen and 25% peptides in terms of protein was contained therein. When 3 Kg of sucrose, 0.05 Kg of 85% phosphoric acid and small amounts of cola essence, coloring agent and artificial sweetenings were added to the syrup and further water was added to make the total volume 30 l, a non-sparkling, cola-type concentrated beverage was obtained.

EXAMPLE 6

Nine Kg of defatted soybena meals was added to 36 l of water, and denaturing of defatted soybean meals was conducted under a pressure of 1 Kg/cm$^2$ for 10 minutes. Then, 24 l of water and 720 g of phosphoric acid were added to the denatured flakes to adjust a pH to 3.8. Then, 90 g of commercially available acid protease was added thereto, and enzymatic decomposition was carried out at 50°C for 6 hours. After the completion of reaction, the decomposition mixture was subjected to pressure filtration, whereby 52 l of acidic filtrate containing peptides was obtained. Then, the solution was treated with active carbon and concentrated to 5 l. The concentrated liquor was clear and odorless, and had no unpleasant flavour, though acidic. The peptides content was 53.5% in terms of protein, and the formol-state nitrogen was 16% on the basis of total nitrogen. Various delicious and nutritive beverages could be prepared from the thus obtained cooncentrated liquor so that the protein content of a product may be 1 to 3% by weight.

EXAMPLE 7

Eight Kg of acid peptides powders obtained in Example 1, 5 Kg of glucose, 0.1 Kg of tartaric acid, 0.8 Kg of sodium bicarbonate and small amounts of powdery fruit essence, Edible Red No. 2, and artificial sweetenings were sufficiently mixed with one another, whereby a fruit soda-type powdery beverage product was obtained.

When 1 part by volume of the thus prepared product was dissolved in about 10 parts by volume of water, very fragrant and nutritive fruit soda having a pH of 4.7 and being free of green knote or bitterness peculiar to the soybeans was obtained.

EXAMPLE 8

Three Kg of acid peptides powders obtained in Example 2 was thoroughly mixed with 4 Kg of glucose, 0.1 Kg of tartaric acid and small amounts of powdery fruit essence, coloring agent, and artificial sweetenings, whereby a fruit-type powdery beverage product was obtained. When 1 part by volume of the thus obtained product was dissolved in about 10 parts by volume of water, a delicious fruit juice was obtained.

EXAMPLE 9

To 25 l of acidic peptides syrup obtained in Example 5 were added 2 Kg of sucrose, 0.1 Kg of malic acid and small amounts of fruit essence, coloring agent and artificial sweetenings, and then the total volume was increased to 50 l by adding water thereto, and further increased to 200 l by adding plain soda thereto, whereby delicious fruit soda was obtained.

EXAMPLE 10

To 20 l of acidic peptides concentrated syrup obtained in Example 4 were added 4 Kg of sucrose, 4 Kg of glucose, 0.1 Kg of malic acid and small amounts of fruit essence, coloring agent and artificial sweetenings, and then the total volume was increased to 40 l by adding water thereto, whereby a very delicious concentrated beverage was obtained.

EXAMPLE 11

To 30 l of acidic peptides concentrated syrup obtained in Example 5 were added 30 l of fermented milk having 20% solid content, 30 Kg of sucrose, 25 Kg of starch syrup, 10 Kg of glucose and small amounts of sour milk flavour, coloring agent, artificial sweetenings and emulsifier, and then a pH was adjusted to 3.4 to 3.5 with 50% lactic acid. The total volume was increased to 180 l by adding water thereto, while homogenizing the solution, and thereby an 8-fold, concentrated sour milk beverage was obtained. When one part by volume of the thus obtained beverage was diluted with 8 parts by volume of water, a very delicious beverage was obtained.

EXAMPLE 12

One hundred and eighty Kg of acidic peptides powders was obtained from 300 Kg of defatted soybean meals using 20 Kg of malic acid in place of citric acid in Example 1. Eighty Kg of the thus obtained powders were thoroughly mixed with 50 Kg of glucose, 1 Kg of tartaric acid, 8 Kg of sodium bicarbonate and small amounts of powdery fruit essence, coloring agent, artificial sweetenings, whereby a sparkling fruit-type powdery beverage product was obtained.

EXAMPLE 13

Five hundreds l of acidic syrup was obtained from 300 Kg of defatted soybean flakes using 1 Kg of an enzyme preparation containing an acid protease, which was obtained by extracting it from koji of wheat bran prepared by using *Aspergillus inuii* ATCC No. 14333 and precipitating it from extract solution with alcohol, in place of the commercially available acid protease in Example 5. To 10 l of the concentrated syrup were added 2 Kg of sucrose, 2 Kg of glucose, 0.05 Kg of malic acid, and small amounts of fruit essence, coloring agent and artificial sweetenings, and then by adding water thereto, 40 l of delicious nutritive beverage free fromn soybean flavour was obtained.

EXAMPLE 14

Six hundreds l of acidic peptides syrup was obtained from 300 Kg of defatted soybean flakes using 27 Kg of lactic acid in place of citric acid in Example 5. To 60 l of the syrup were added 50 l of fermented milk, 50 Kg of sucrose, 40 Kg of millet jelly, 20 Kg of glucose and small amounts of sour milk flavour, coloring agent, artificial sweetenings and emulsifier, and the total volume was made to 350 l by adding water thereto while homogenizing the syrup, whereby a concentrated sour milk beverage was obtained.

EXAMPLE 15

To 200 Kg of acidic peptide powders obtained in Example 1 was added and mixed 5 Kg of methionine. To 10 Kg of the resulting powdery mixture were added and thoroughly mixed 10 Kg of glucose, 0.4 Kg of tartaric acid, 1 Kg of sodium bicarbonate and small amounts of powdery cola essence, coloring agent and artificial sweetenings, whereby a nutritively excellent, sparkling cola-type powdery beverage product was obtained. When 1 part by volume of the thus obtained product was dissolved in 10 parts by volume of water, a very delicious, highly nutritive beverage was obtained.

EXAMPLE 16

To 1 Kg of defatted soybean meals was added 1.5 l of water. After thorough soaking, denaturation was carried out under a pressure of 0.8 Kg/cm$^2$ for 45 minutes, and then 3.5 l of water, 50 g of citric acid, and 5 g of commercially available acid protease (Moslin, trade mark of an acid protease manufactured by Seishin Seiyaku Co., Ltd.) were added thereto. Enzymatic decomposition was conducted at 45°C for 10 hours with thorough stirring. After the decomposition, the decomposition mixture was subjected to pressure filtration, and the resulting filtrate was treated with 50 g of active carbon, whereby 42 l of acidic peptides solution having a pH of 4.2 was obtained.

The thus obtained solution contained 6.1% peptides in terms of protein, and the ratio of formol-state nitrogen to total nitrogen was 17%.

When the same volume of water was added to the solution, a plain acidic beverage free of green knote or cooked beany flavour or unpleasant flavour was obtained.

EXAMPLE 17

Thirty Kg of defatted soybean flakes were added to 40 l of water, and denaturation of defatted soybean flakes was conducted in an autoclave under a pressure of 1 Kg/cm$^2$ for 30 minutes. Then, 260 l of water were added thereto and the resultant was subjected to a colloid mill to crush said flakes well. Thereafter, the pH of the mixture was adjusted to 3.5 by the addition of phosphoric acid. To the thus prepared solution was added 150 grams of a crude enzyme preparation containing a thermostable acid protease. The enzyme preparation was prepared in the manner described below:

Koji obtained by culturing *Penicillium duponti* ATCC 21086 on bran, see example 1 of application 884,740, was extracted with a five-fold volume of water. To the thus obtained extract was added a three-fold volume of cold alcohol to effect precipitation, and the formed precipitates were recovered by centrifuging and dried in vacuo.

Enzymatic decomposition was conducted at 65°C for 20 hours while stirring. After the completion of reaction, the decomposition mixture was subjected to pressure filtration, whereby 240 l of a solution was obtained. The solution was clear and odorless, and had no unpleasant flavor, though acidic. The peptide content was 3.9% in the terms of protein, and the formol-state nitrogen was 13.8% on the basis of total nitrogen. When to the thus obtained solution are added suitable amounts of sucrose, fruits essence, coloring agents and the like, a very delicious beverage is obtained. When to the thus obtained solution are added 6 Kg of sucrose, 0.03 Kg of tartaric acid and small amounts of cola essence and coloring agent, and then the mixture is filled with water until the total volume of solution is 50 l. a very delicious cola-type drink is obtained.

What is claimed is:

1. A method for preparing an acidic beverage having a pH of less than 6.0 and capable of retaining clarity, provided that the beverage is free from other colloidal material, which comprises denaturing defatted soybeans by heating or steam cooking, subjecting the thus denatured soybeans to the enzymatic action of an acid protease at a pH of 2.5 to 6.0 at a temperature of 40° to 75°C to form soluble peptides until before the ration of formol-state nitrogen to total nitrogen in a filtrate of the resulting reaction mixture reaches 20%, separating a clear portion from the reaction mixture, and adding a beverage additive to the clear portion.

2. A method according to claim 1 wherein the denaturing of the protein of defatted soybeans is conducted in the presence of water or lower alcohol by steam cooking under a pressure of 0.8 to 1.0 Kg/cm$^2$.

3. A method according to claim 1 wherein an acid protease produced by a microorganism of black mold group belonging to Black Aspergillus type mold is used.

4. A method according to claim 3 wherein the acid protease produced by *Aspergillus inuii* ATCC No. 14333, *Aspergillus usamii* ATCC No. 14331 or *Aspergillus saitoi* ATCC No. 14332 is used.

5. A method according to claim 1 wherein the acid protease is an enzyme preparation.

6. A method according to claim 1 wherein 0.05 to 2.0% by weight of the acid protease is used on the basis of the weight of defatted soybeans.

7. A method according to claim 1 wherein the clear portion is used after having beeen purified by solvent extraction, or active carbon or ion exchange resin adsorption.

8. A method according to claim 1 wherein the clear portion is used after having been concentrated.

9. A method according to claim 1 wherein the clear portion is used after having been dried.

10. A method according to claim 1 wherein the beverage additive consists of at least one member selected from the group consisting of water, fruit juices, sweetenings, vessicatories, flavors, organic acids, coloring agents, nutritive intensifiers, physiologically active substances and emulsified substances.

11. A method according to claim 10 wherein the sweetenings are sucrose, glucose or artificial sweetenings; the vessicatories are sodium bicarbonate; flavors are fruit essence or beverage essence; the organic acids are lactic acid, malic acid, citric acid or tartaric acid; the coloring agents are caramel; the nutritive intensifiers are amino acids or vitamins; the physiologically active substances are hormones; and the emulsified substances are fermented milk.

12. A method according to claim 1 wherein a thermostable acid protease produced by *Penicillium duponti* ATCC 20186 is used.

13. In a method for preparing an acidic beverage having a pH of less than 6.0 and capable of retaining substantial clarity when peptides are added thereto, provided that said beverage is free from other colloidal material, said method comprising (a) denaturing soybeans by heating or steam cooking, (b) subjecting the thus denatured soybeans to enzymatic action to form peptides, (c) separating a clear portion from the reaction mixture, and (d) adding a beverage additive to the clear portion; the improvement of solubilizing the soybean protein including subjecting the denatured soybeans of step (a) to the enzymatic action of an acid protease produced by *Aspergillus inuii* ATCC No. 14333, *Aspergillus usamii* ATCC No. 14331, *Aspergillus saitoi* ATCC No. 14332 and *Penicillum duponti* ATCC No. 20186, at a pH of 2.5 to 6.0 and at a temperature of 40° to 75°C to form peptides until before the ratio of formol-state nitrogen to total nitrogen in a filtrate of the resulting reaction mixture reaches 20%, the thus-formed peptides being substantially soluble in acidic flavoring media having a pH of below 6.0 without coagulation and precipitation.

* * * * *